United States Patent Office 2,809,912
Patented Oct. 15, 1957

2,809,912
N-ETHYLENE TRICHLOROMETHYL SULFENAMIDE

Gail H. Birum, Dayton, Ohio, assignor to Monsanto Chemical Company, St. Louis, Mo., a corporation of Delaware No Drawing. Application May 18, 1956,
Serial No. 585,618

6 Claims. (Cl. 167—33)

The present invention relates to nitrogenous compounds of sulfur and more particularly provides the new and hitherto unknown N-ethylenetrichloromethylsulfenamide of the structure

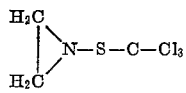

The invention also provides the method of preparing the new amide and bacteriostatic compositions comprising said amide as the essential effective ingredient.

According to the invention, the amide is obtained by the reaction of ethyleneimine with perchloromethyl mercaptan substantially according to the scheme:

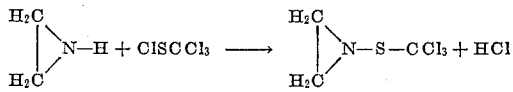

Reaction of the ethyleneimine with the perchloromethyl mercaptan takes place easily by mixing the reactants, advantageously at ordinary room temperature or with cooling. Preferably an inert diluent or solvent, e. g., benzene, hexane or ether is used. The reaction takes place with evolution of hydrogen chloride; and removal of this by-product as it is formed facilitates the condensation. This may be done by vigorous stirring and dephlegmation; but for smooth reaction and optimum yields of the amide it is preferred to remove the hydrogen chloride by working in the presence of a salt-forming organic base, e. g., pyridine and other tertiary nitrogen compounds such as the trialkylamines and the trialkanolamines. The hydrochloride thus formed is readily separated from the reaction mixture by filtration. When reaction has been effected in the presence of a diluent, the N-ethylenetrichloromethylsulfenamide is readily separated therefrom by distillation.

The present amide is a stable, well characterized compound which may be advantageously employed for a variety of commercial and agricultural purposes. As disclosed in my copending application Serial No. 585,619, filed of even date, when reacted with alkyl or aryl phosphites it gives esters of nitrogenous thiomethylidyne triphosphonates which possess a high degree of contact, residual and systemic insecticide activity. The present N-ethylenetrichloromethylsulfenamide in itself possesses marked biological activity. It is an effective bacteriostat at very low concentrations and also inhibits fungus growth, e. g., it completely suppresses the growth of the fungus *Aspergillus niger* at a concentration of one part of amide per 10,000 parts of diluent.

The invention is further illustrated but not limited by the following examples.

*Example 1*

Benzene (100 ml.) and 93 g. (0.5 mole) of perchloromethyl mercaptan were charged to a flask fitted with a glass stirrer, thermometer, dropping funnel and condenser equipped with a trap. The whole was cooled in an ice-bath and a solution consisting of 21.5 g. (0.5 mole) of ethyleneimine and 56 g. (0.55 mole) of triethylamine in 100 ml. of benzene was then added during 30 minutes at a temperature of 5–24° C. The reaction mixture became viscous. It was stirred at room temperature for one hour, toward the end of which time 200 ml. of hexane was added. The reaction mixture was then filtered and the solid (probably triethylamine hydrochloride) was washed twice with hexane. Distillation of the combined filtrate and washings gave 66 g. (69% theoretical yield) of the substantially pure N-ethylenetrichloromethylsulfenamide, B. P. 51–60° C./0.1–0.2 mm., $n_D^{25}$ 1.5420, and analyzing as follows:

|  | Found | Calcd. for $C_3H_4Cl_3NS$ |
|---|---|---|
| Percent C | 18.91 | 18.7 |
| Percent H | 2.13 | 2.1 |
| Percent N | 7.08 | 7.3 |
| Percent S | 15.99 | 16.6 |

*Example 2*

This example shows bacteriostat testing of the N-ethylenetrichloromethylsulfenamide of Example 1 against the organisms *Micrococcus pyogenes* var. *aureus* and *Salmonella typhosa*. A 1% stock solution of the amide in a non-toxic solvent was added to a nutrient agar to give respective test samples containing one part of the amide per thousand parts of the agar and one part of the amide per ten thousand parts of the agar. Petri dishes were respectively filled with each of the two test mixtures, and the plates thus prepared were respectively inoculated with said Micrococcus and said Salmonella organisms. They were then incubated for two days at a temperature of 37° C. At the end of that time inspection of the plates showed complete inhibition of growth of both the Micrococcus and the Salmonella organisms in each of the test samples, i. e., at either the 1:1,000 or the 1:10,000 concentration, whereas "blank" samples of similarly inoculated agar containing none of said amide showed profuse growth after incubation under the same conditions.

When employed as a bacteriostat the N-ethylenetrichloromethylsulfenamide may be incorporated into organic solvents or into emulsions prepared by mixing solutions of the amide with water in the presence of an emulsifying agent.

What I claim is:

1. N-ethylenetrichloromethylsulfenamide.
2. The method which comprises contacting ethyleneimine with perchloromethyl mercaptan and recovering N-ethylenetrichloromethylsulfenamide from the resulting reaction product.
3. The method which comprises contacting ethyleneimine with perchloromethyl mercaptan in the presence of an inert diluent and recovering N-ethylenetrichloromethylsulfenamide from the resulting reaction product.
4. The method which comprises contacting ethyleneimine with perchloromethyl mercaptan in the presence of an inert diluent and a salt-forming organic base and recovering N-ethylenetrichloromethylsulfenamide from the resulting reaction product.
5. A bacteriostatic composition comprising an inert carrier and N-ethylenetrichloromethylsulfenamide as the essential effective ingredient.
6. The method of inhibiting the growth of microorganisms which comprises exposing said organisms to a growth-inhibiting quantity of N-ethylenetrichloromethylsulfenamide.

References Cited in the file of this patent

UNITED STATES PATENTS

| 2,553,770 | Kittleson | May 22, 1951 |
| 2,553,776 | Kittleson | May 22, 1951 |
| 2,653,155 | Kittleson | Sept. 22, 1953 |
| 2,713,058 | Kittleson | July 12, 1955 |